United States Patent
Hori et al.

(10) Patent No.: US 10,733,430 B2
(45) Date of Patent: Aug. 4, 2020

(54) TOILET USAGE MANAGEMENT SYSTEM AND CAT TOILET

(71) Applicant: Hachi Tama INC., Fujisawa-shi, Kanagawa (JP)

(72) Inventors: Koji Hori, Fujisawa (JP); Mari Ohbuchi, Fujisawa (JP); Teruki Hirahata, Fujisawa (JP); Atsushi Hiroyama, Fujisawa (JP)

(73) Assignee: HACHI TAMA INC., Fujisawa-Shi, Kanagawa (JP)

( * ) Notice: Subject to any disclaimer, the term of this patent is extended or adjusted under 35 U.S.C. 154(b) by 0 days.

(21) Appl. No.: 16/339,587

(22) PCT Filed: Aug. 29, 2018

(86) PCT No.: PCT/JP2018/031936
§ 371 (c)(1),
(2) Date: Apr. 4, 2019

(87) PCT Pub. No.: WO2019/044899
PCT Pub. Date: Mar. 7, 2019

(65) Prior Publication Data
US 2020/0042780 A1 Feb. 6, 2020

(30) Foreign Application Priority Data

Aug. 29, 2017 (JP) .................. 2017-163883
Jan. 11, 2018 (JP) .................. 2018-002330

(51) Int. Cl.
*G06K 9/00* (2006.01)
*A01K 1/01* (2006.01)
*G06K 9/62* (2006.01)

(52) U.S. Cl.
CPC ........ *G06K 9/00362* (2013.01); *A01K 1/0107* (2013.01); *G06K 9/6263* (2013.01)

(58) Field of Classification Search
CPC .... A01K 1/0107; A01K 1/011; A01K 1/0114; A01K 1/035; A01K 15/021; A01K 1/0125
See application file for complete search history.

(56) References Cited

U.S. PATENT DOCUMENTS

| | | | | |
|---|---|---|---|---|
| 6,424,727 B1 * | 7/2002 | Musgrave | ............ | A01K 11/006 382/116 |
| 7,564,994 B1 * | 7/2009 | Steinberg | .............. | G06F 16/583 382/118 |

(Continued)

FOREIGN PATENT DOCUMENTS

| CN | 105007421 A | 10/2015 |
|---|---|---|
| CN | 205511430 U | 8/2016 |

(Continued)

OTHER PUBLICATIONS

L.M. Freeman et al, "Evaluation of Weigh Loss Over Time in Cats with Chronic Kidney Disease", Journal of Veterinary Internal Medicine, 2016, 30, 1661-1666.

(Continued)

*Primary Examiner* — Ian L Lemieux
(74) *Attorney, Agent, or Firm* — Masuvalley & Partners

(57) ABSTRACT

A cat toilet, etc., which specifies precisely one cat who entered a toilet for cat is provided. The present invention relates to a camera for capturing a plurality of images of a cat entering a cat toilet, a cat identifying process for identifying identifiers of one cat appearing in a plurality of images based on a plurality of images captured by the camera section, the cat identification processing section extracts each feature amount from a plurality of images, determines the identifer of one cat as the identification result for each image based on the feature amount, and makes a majority decision of the identification result based on this, identifiers of one cat appearing in a plurality of images are specified.

3 Claims, 15 Drawing Sheets

(56) References Cited

U.S. PATENT DOCUMENTS

| | | | |
|---|---|---|---|
| 2006/0196445 A1* | 9/2006 | Kates | A01K 15/02 |
| | | | 119/719 |
| 2012/0299731 A1* | 11/2012 | Triener | G01G 17/08 |
| | | | 340/573.1 |
| 2013/0258117 A1* | 10/2013 | Penov | G06K 9/6202 |
| | | | 348/207.1 |
| 2014/0311415 A1* | 10/2014 | Tanigawa | A01K 29/005 |
| | | | 119/163 |
| 2015/0078626 A1* | 3/2015 | Kinard | G06K 9/6201 |
| | | | 382/110 |
| 2015/0113634 A1* | 4/2015 | Mau | G06K 9/6277 |
| | | | 726/19 |
| 2015/0143750 A1* | 5/2015 | Jalbert | E06B 7/32 |
| | | | 49/25 |
| 2016/0262356 A1 | 9/2016 | Perez-Camargo et al. | |
| 2017/0196196 A1* | 7/2017 | Trottier | A01K 5/0283 |
| 2017/0273273 A1* | 9/2017 | Chou | A01K 1/0107 |
| 2018/0228129 A1* | 8/2018 | Yajima | G06K 9/00979 |
| 2019/0014739 A1* | 1/2019 | Darmanjian | A01K 1/0107 |

FOREIGN PATENT DOCUMENTS

| | | |
|---|---|---|
| JP | 2009-153409 A | 7/2009 |
| JP | 2016-214173 A | 12/2016 |
| JP | 2018-007625 A | 1/2018 |
| WO | 2017/110161 A1 | 6/2017 |

OTHER PUBLICATIONS

ISA/JP, International Search Report dated Nov. 20, 2018, International Application No. PCT/JP2018/031936, 2 pages.

* cited by examiner

Fig.1
| IRIS Classification | Creatinine concentration in the blood (mg/dl) | Symptoms |
|---|---|---|
| Stage 1 | <1.6 | no clinical symptoms seen in the appearance |
| Stage 2 | 1.6~2.8 | polydipsia / polyuria can be seen |
| Stage 3 | 2.9~5.0 | clinical symptoms such as loss of appetite and vomiting |
| Stage 4 | 5.0< | the symptom appears strongly |
Fig.2
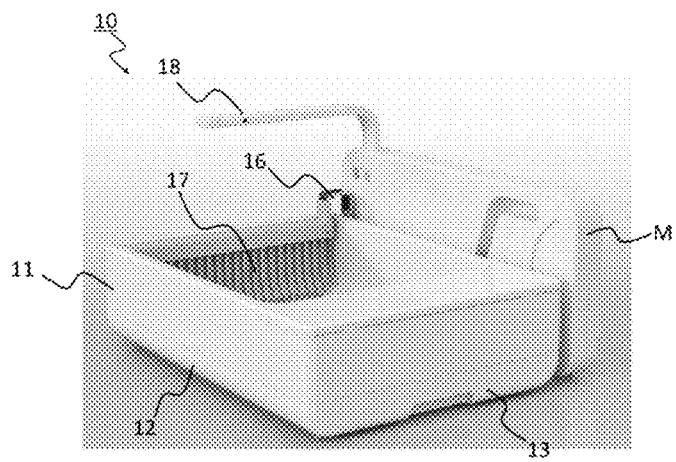
Fig.3
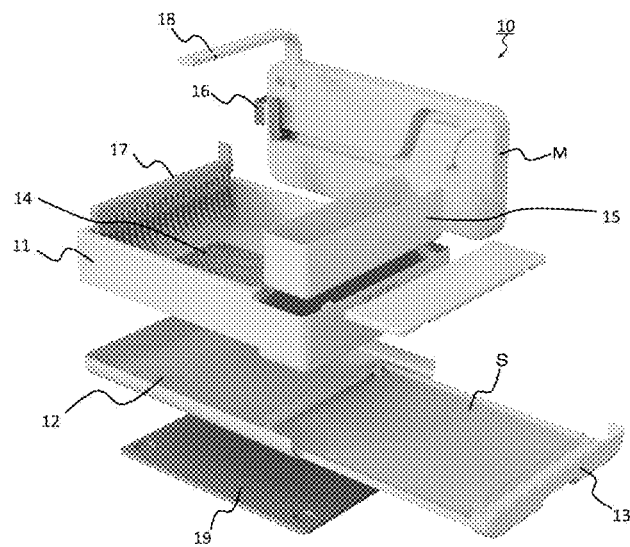

Fig.8
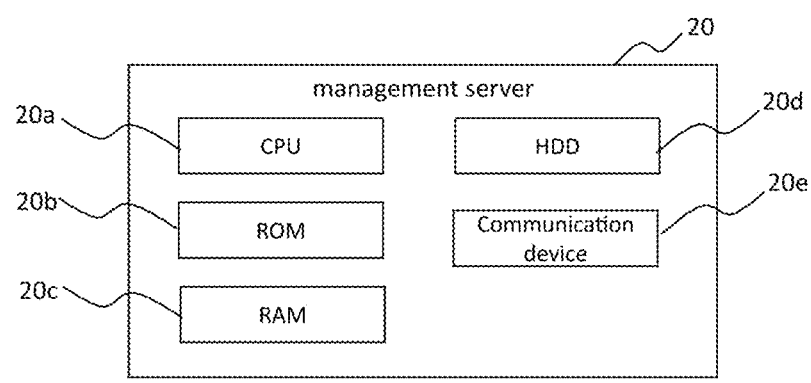
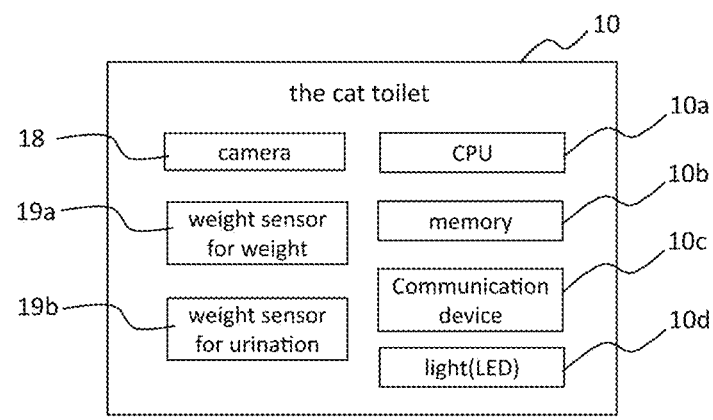

Fig. 10

| usage status management DB | | | | | | | | | | | |
|---|---|---|---|---|---|---|---|---|---|---|---|
| user ID | cat ID | name | type | birthday | sex | body weight | urination frequency | urine amount | body weight threshold (kg) | urination frequency threshold (times) | urine amount threshold (mg) |
| 001 | 01 | Mozuku | exotic short hair | 2015/4/1 | male | 3.25 | 3 | 120 | 3.30 | 2 | 150 |
| | 02 | Mona | " | 2017/12/25 | female | 4.06 | 3 | 90 | 3.70 | 4 | 120 |
| | 03 | Tama | " | 2015/4/5 | male | 3.81 | 1 | 90 | 3.90 | 4 | 100 |
| 002 | 01 | Tama | " | 2014/8/1 | male | 3.80 | 1 | 20 | 3.90 | 4 | 100 |
| 003 | 01 | Hana | " | 2015/2/1 | female | 3.95 | 1 | 20 | 3.60 | 4 | 100 |
| | 02 | Maron | " | 2016/11/11 | female | 4.25 | 2 | 110 | 3.70 | 5 | 100 |
| | 03 | Sakura | " | 2012/4/1 | female | 4.12 | 0 | 0 | 3.60 | 3 | 70 |

Fig.18

| cat images | cat ID | probability | identification result |
|---|---|---|---|
| A | cat ID:01<br>cat ID:02 | 99%<br>1% | *cat ID:01* |
| B | cat ID:01<br>cat ID:02 | 20%<br>80% | cat ID:02 |
| C | cat ID:01<br>cat ID:02 | 97%<br>3% | *cat ID:01* |
| D | cat ID:01<br>cat ID:02 | 10%<br>90% | cat ID:02 |
| E | cat ID:01<br>cat ID:02 | 90%<br>10% | *cat ID:01* |

→ cat ID:01  3 votes
cat ID:02  2 votes

Fig.19

| cat images | cat ID | probability | identification result |
|---|---|---|---|
| A | cat ID:01<br>cat ID:02<br>cat ID:03 | 95%<br>1%<br>4% | cat ID:01 |
| B | cat ID:01<br>cat ID:02<br>cat ID:03 | 10%<br>80%<br>10% | cat ID:02 |
| C | cat ID:01<br>cat ID:02<br>cat ID:03 | 93%<br>3%<br>4% | cat ID:01 |
| D | cat ID:01<br>cat ID:02<br>cat ID:03 | 7%<br>90%<br>3% | cat ID:02 |
| E | cat ID:01<br>cat ID:02<br>cat ID:03 | 2%<br>7%<br>91% | cat ID:03 |

→ cat ID:01  2 votes
cat ID:02  2 votes
cat ID:02  1 votes

TOILET USAGE MANAGEMENT SYSTEM AND CAT TOILET

RELATED APPLICATIONS

This application is the U.S. National Phase of and claims priority to International Patent Application No. PCT/JP2018/031936, International Filing Date Aug. 29, 2018; which claims benefit of Japanese Patent Application No. 2017-163883 filed Aug. 29, 2017 and Japanese Patent Application No. 2018-002330 filed Jan. 11, 2018; both of which are incorporated herein by reference in their entireties.

TECHNICAL FIELD

The present invention relates to a toilet usage management system for cats and a cat toilet.

BACKGROUND ART

In recent years, the number of owners who keep dogs and cats as pets in their homes is increasing. For this reason, home-use pet toilets (or toilet for cats) with various functions such as a deodorant function for removing odor components and an automatic cleaning function for excrement are widely used.

Here, one of the painful problems of the head is the cat's health problem, especially to the owner who owns the "cat". Especially in the case of cats, there are many diseases of urology and there are data that indicate that nearly half of them experience urological diseases.

With respect to prophylactic of illness of urinal system, one of important things that the owner can do is to keep the toilet clean. A cat is known as an animal that likes clean circumstance, and if the toilet is dirty the cat may be stressed, so the owner needs to keep checking the daily toilets and keeping the toilet clean at all times.

Also, as a sign or symptom of illness of urinary system in cats, there are phenomena such as an increase in the number and urine amount (see FIG. 1 described later) and weight loss (see Non-Patent Document 1). For this reason, it is desired that the owner constantly observes the number of urinations at toilet of the own cat, or carries out weight measurement periodically, and consult a veterinarian or the like promptly when an abnormality is seen in the own cat.

As a technique relating to this, Patent Document 1 discloses a pet excretion number counting apparatus that enables a user to quickly find a disease of a pet such as diabetes or cystitis, whose initial symptom is an increase in the number of excretions.

In addition, Patent Document 2 discloses an animal toilet box that detects urine amount of an animal to display the urine amount on a display unit, which enables early detection of chronic renal failure with increased urine amount, for example.

In addition, Non-Patent Document 1 discloses a survey result that weight loss is observed before a cat is diagnosed as chronic renal disease.

[Patent Document 1] Japanese Laid-Open Patent Application Publication No. 2009-153409
[Patent Document 2] International Publication No. 2017/110161
[Non-patent document 1] LM Freeman, three others, "Evaluation of Weight Loss Over Time in Cats with Chronic renal Disease"[online], 2016 September-October, J Vet Intern Med, [Dec. 25, 2017 search performed], Internet <URL: https://www.ncbi.nlm.nih.gov/pmc/articles/PMC5032880/>

DISCLOSURE OF INVENTION

Problem to be Solved by Invention

On the other hand, the number of owners who keep plurality of pets has increased in recent years. Especially in the case of a cat, according to statistic data the average number of cats per owner is 1.78. In the case of owning a plurality of cats, in order to manage the health condition of each cat (for example, weight and urine amount) using the cat toilet, it is necessary to specify which cat, among the many cats, is in the cat toilet. However, the inventions described in the above-mentioned Patent Documents 1 and 2 cannot suitably cope with the recent rapid increase of owning the plurality of pets.

As a general cat identification method, for example, there is a method of identifying a cat individually by attaching a collar equipped with an RFID (radio frequency identifier) tag to a cat. However, some cats dislike the collar, so forcing the collar may forcibly cause stress and eventually cause illness.

The present invention has been made in view of the above points, and one object is to provide a cat toilet or the like that precisely identifies one cat that has entered a cat toilet.

Means to Solve the Problem

In order to solve the above problem, the cat toilet use status management system according to the present invention is configured to include a cat toilet, a user terminal, and a management server, and notifies the user terminal of the information on the use of the litter of the cat to the user terminal wherein the cat toilet includes a camera for capturing a plurality of images of a cat entering the cat toilet, and a litter box for cat toilet And a cat identifying unit for identifying an identifier of a cat included in the image of the cat, the cat identifying unit extracts feature amounts from the plurality of images, Determines an identifier of one cat as an identification result for each image and specifies an identifier of one cat appearing in the plurality of images based on the majority vote of the identification result.

Advantage of the Invention

According to the embodiment of the present invention, it is possible to provide a cat toilet that can easily measure information on a health status of a cat. In addition, it is possible to provide a cat toilet that can promptly predict diseases of urinary system in particular in the case of the diseases being suspected.

BRIEF DESCRIPTION OF DRAWINGS

FIG. 1 is a diagram showing IRIS stage classification of renal failure according to the present embodiment.

FIG. 2 is a view showing an overall external appearance of a cat toilet according to the present embodiment.

FIG. 3 is a diagram showing an example of an overall component configuration of a cat toilet according to the present embodiment.

FIG. 8 is a diagram showing an example of a hardware configuration of a control system of a cat toilet and a management server according to the present embodiment.

FIG. 10 is a diagram showing an example of data of a usage status management DB 203a according to the present embodiment.

FIG. 18 is a diagram for explaining a cat identifying example 1 according to the present embodiment.

FIG. 19 is a view for explaining a cat identifying example 2 according to the present embodiment.

BEST MODE FOR CARRYING OUT THE INVENTION

Figure 4:
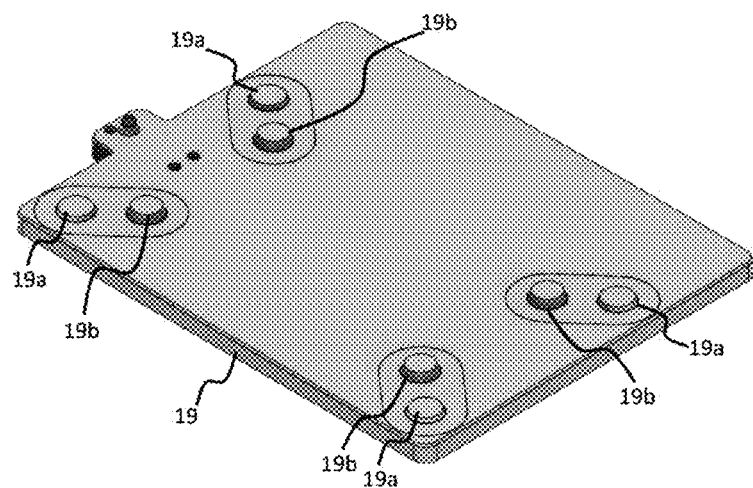
FIG. 4 is a diagram showing a component configuration example of a sensor plate of a cat toilet according to the present embodiment.

Embodiments will be described in detail with reference to the drawings. In the following embodiments, a case of a cat will be described in detail as an example of a pet.

Background

As mentioned above, cats are said to have very many diseases of urology, and it is said that almost half of them experience urological diseases. Especially the most fearful of cat urinary system disease is renal failure. Currently renal failure is the leading cause of death in cats, and it is also an incurable disease.

FIG. 1 is a diagram showing IRIS stage classification of renal failure according to this embodiment (Source: International Renal Interest Society). According to the IRIS stage classification of FIG. 1, the severity of renal failure is classified by the creatinine concentration in the blood.

Under such circumstances, in 2017, the sale of a cat renal failure treatment drug "Laprous" (registered trademark) was started. However, this new drug is said to be applicable to stages 2 and 3 of renal failure, and it is said that there is no effect in other stages. Although the severity of renal failure itself can be determined by conducting a blood test, it is generally difficult to find renal failure at an early stage because cats generally have few opportunities to go to an animal hospital compared to dogs and the like. At the stage of stage 4, since "the symptom appears strongly", the owner can easily find the abnormality, but even the owner brings the cat to the hospital at this stage, the owner can no longer expect the new medicinal effect at this stage. In other words, in present it is difficult to use such a new medicine.

It should be noted that, with respect to stage 2 symptoms "polydipsia/polyuria can be seen", the owner needs to keep an eye on the own cat's drinking/polyuria symptoms in everyday life. There is also a study that weight loss is seen before cats are diagnosed as chronic renal disease (see Non-Patent Document 1). Therefore, if at least the symptoms of polydipsia/polyuria and/or weight loss are seen in the own cat, the owner is expected to consult a veterinarian or the like promptly in doubt of the renal failure of the own cat. Even if it is a diagnosis of renal failure by blood examination, if it is stage 2 or 3, it can be expected to recover until the own cat revives again due to the new drug effect.

Based on the above, the cat toilet usage management system according to the present embodiment will be described in detail below.

<System Configuration>

(Cat Toilet)

FIG. 2 is a view showing the overall external appearance of the cat toilet according to the present embodiment. FIG. 3 is a diagram showing an example of an overall component configuration of the cat toilet according to the present embodiment. Identical parts are given the same reference numerals.

The cat toilet 10 is a multilayered fully automated toilet developed for cats. In the case of a multilayer type (for example, two-layer type), an upper layer toilet container 11 is provided on the upper layer of the toilet, and a cat sand (not shown) is placed on the upper layer toilet container 11. A lower layer toilet container 12 and a urine collection tray 13 are provided in the lower layer of the toilet, and a pet sheet S (commercially available product or the like) having water absorption and deodorizing effects is laid on a urine collection tray 13 that can be drawn out from the lower layer toilet container 12. When the cat is excreted, feces is received by the cat sand of the upper layer toilet container 11, and the urine passing through a feces-urine separation hole 14 provided at the bottom of the upper layer toilet container 11 and is received and absorbed by the pet sheet S of the collection tray 13 which is accommodated in the lower layer toilet container 12.

In addition, a fully automation means that there is a cleaning function of automatically collecting discharged defecation received by cat sand to a feces collection tray 15. That is, when the feces of the cat is detected, a feces collection drive unit (feces collection mechanism) 16 provided on a control board M on the side is driven to physically move a feces collection comb 17 provided on the side of the upper layer toilet container 11 toward the feces collection tray 15, so that the feces on the cat sand are gathered and then feces are automatically collected and stored in the feces collection tray 15.

Furthermore, the cat toilet 10 according to the present embodiment has an IoT device aspect including a camera 18, a sensor plate 19, etc., in addition to the original function as such a toilet (an excretion place from a cat), and has a function of managing a cat toilet usage, in particular, weight of the cat and the urination condition of the cat for the above-described prediction of renal failure. This point will be described again later.

The cat toilet 10 can be installed at an appropriate place in a facility where the cat toilet 10 is supposed to be used, such as in a household, animal hospital, a pet hotel, an animal protection facility, or the like. With respect to the number of cat toilets installed, there are many owners who install multiple toilets such as the cat toilet 10-1 and the cat toilet 10-2, even in the case of owning one cat, needless to say, in the case of owning plurality of cats in recent years.

FIG. 4 is a diagram showing an example of a component configuration of the sensor plate of the cat toilet according to the present embodiment.

The sensor plate 19 is provided with a weight sensor as a measuring instrument for measuring (weighing) the weight of the cat toilet 10 and the load of the urine amount and is installed on the lowest layer (bottom) of the cat toilet 10 as a whole. As shown in the figure, at the four outer corners of the sensor plate 19, there are total four body sensors 19a, one at each corner, for measuring the body weight of cats, one at each corner, and, at the inner four corners, there are total four urine weight sensors 19b, one at each corner, for measuring the urine amount of cats.

Figure 5:
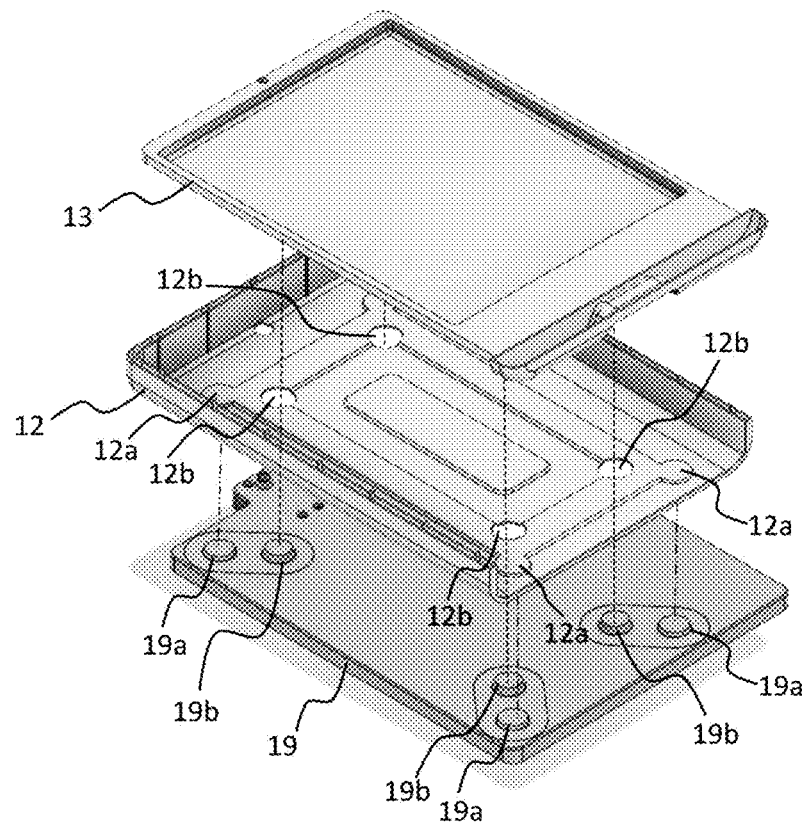
FIG. 5 is a diagram showing an example of a component configuration of a lower layer toilet container, a urine collection tray and a sensor plate of the cat toilet according to the present embodiment.
Figure 6:
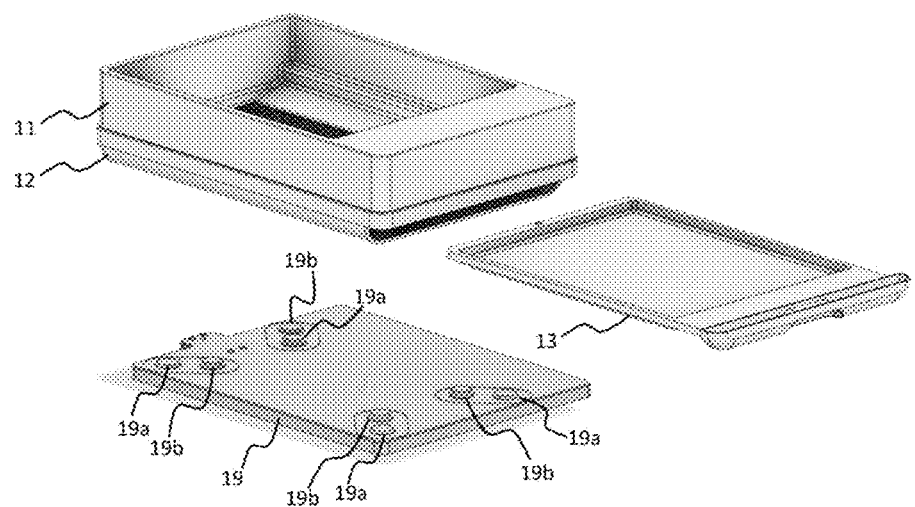
FIG. 6 is a diagram showing an example of a component configuration of an upper layer toilet container, a lower layer toilet container, a urine collection tray, and a sensor plate of the cat toilet according to the present embodiment.

FIG. 5 is a diagram showing an example of a component configuration of the lower toilet container, the urine collection tray, and the sensor plate of the cat toilet according to the present embodiment. FIG. 6 is a diagram showing an example of a component configuration of the upper toilet container, the lower toilet container, the urine collection tray, and the sensor plate of the cat toilet according to the present embodiment.

As shown in the figure, the lower layer toilet container 12 has four recessed portions 12a and four holes 12b penetrating the container. When the lower toilet container 12 is superimposed on the sensor plate 19, the convex urine weight sensors 19b are fitted to the four holes 12b. In addition, the four convex weight sensors 19a are fitted into the recessed portion 12a on the back surface of the lower toilet container 12, respectively.

When the urine collection tray 13 is accommodated/installed in the lower layer toilet container 12, only the urine collection tray 13 is grounded on the four urine weight sensors 19b in the lower layer toilet container 12. That is, since only the load (gravity) of the urine collection tray 13 acts on the urine weight sensor 19b, the urine weight sensors 19b can measure the urine amount, when the cat urinates, by detecting the change in weight before and after the urination.

It is noted that the height of the protrusions of the convex urine weight sensors 19b is higher than the body weight sensors 19a by at least the thickness of the bottom plate of the lower toilet container 12.

On the other hand, the lower layer toilet container 12 and the upper layer toilet container 11 are grounded on the four body weight sensors 19a through the four recesses 12a of the lower layer toilet container 12. That is, since the load (weight (gravity) of the urine collection tray 13 is excluded) of the lower layer toilet container 12 and the upper layer toilet container 11 acts on the body weight sensors 19a, when the cat enters the cat toilet 10 (when the cat is on the upper layer toilet container 11), the body weight sensors 19a can measure the body weight by detecting the change between the weight before the cat enters the cat toilet 10 and the weight after the cat enters the cat toilet 10.

As described above, according to the cat toilet 10 of the present embodiment, it is possible to simultaneously measure the body weight and urine amounts of the cats. That is, information on the health status of the cats can be easily measured in the daily activities of the cats. In addition, since the cat toilet 10 according to the present embodiment can be manufactured with a relatively small number of components and a simple structure, it can be provided at low cost. Furthermore, since it is easy for the user to disassemble and assemble the cat toilet 10 by themselves, the cat toilet 10 is easy to be cleaned and can be kept clean. It is also useful from the viewpoint of disease prevention because the cats have stress if the toilets are dirty.

It is desirable that the recesses 12a at the four locations of the lower toilet container 12 be provided from the viewpoint of structural stability, but they are not indispensable. That is, the lower layer toilet container 12 and the upper layer toilet container 11 may be configured such that the bottom surface of the upper layer toilet container 11 is grounded directly on the four body weight sensors 19a, as long as the load of the lower layer toilet container 12 and the upper layer toilet container 12 acts on the body weight sensors 19a.

Further, in FIG. 3, the depressions 12a and the holes 12b of the lower toilet container 12 and the body weight sensors 19a and the urine weight sensors 19b for provided on the sensor plate 19 are not shown.

(Network Configuration)

Figure 7:
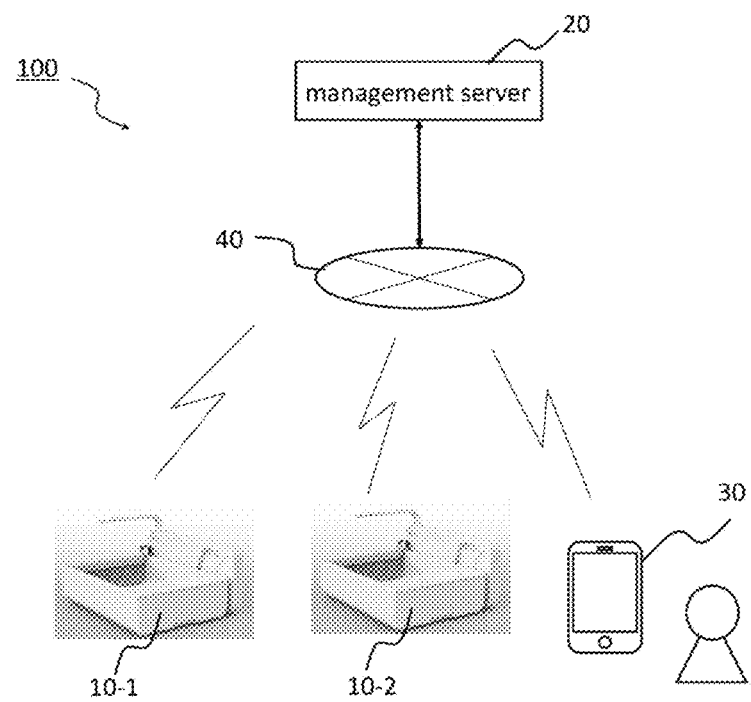
FIG. 7 is a diagram showing a configuration example of a cat toilet usage management system according to the present embodiment.

FIG. 7 is a diagram showing a configuration example of the cat toilet usage management system according to the present embodiment. In FIG. 7, cat toilet usage management system 100 includes the cat toilet 10, a management server 20, and a mobile terminal 30, and they are connected via a network 40.

The management server 20 is a device that manages the use situation of the cat toilet 10 by the own cats. The management server 20 receives usage information of the cat toilet 10 from the cat toilet 10 via the network 40 and manages the usage information. Also, the management server 20 transmits (notifies) the usage information of the cat toilet 10 to the mobile terminal 30 of the user. The management server 20 may be located on the network 40 that can communicate with the cat toilet 10 and the mobile terminal 30 and may be installed in a data center or the like on the Internet, for example.

The mobile terminal 30 is a user terminal for viewing usage information of the cat toilet 10 received from the management server 20. For example, a smartphone or a tablet terminal may be used, but it may be any other information processing apparatus including a PC (Personal Computer) or the like.

The network 30 is a communication network including wired and wireless. The network 40 includes, for example, the Internet, a public line network, a WiFi (registered trademark), a short distance radio, and the like.

<Hardware Configuration>

FIG. 8 is a diagram showing an example of a control system hardware configuration of the cat toilet and the management server according to the present embodiment.

(Cat Toilet)

The cat toilet 10 includes the camera 18, the body weight sensors 19a, the urine weight sensors 19b, a CPU 10a, a memory 10b, a communication device 10c, and a light 10d.

The camera 18, the weight sensor 19a for weight, and the weight sensor 19b for urination are detection devices for detecting the use situation of the cat toilet 10 by cats by detecting and recognizing the cat entering the cat toilet 10.

The CPU 10a of the controller/processor that controls the various detection devices and the light 10d. In addition, various functional units to be described later are executed and realized by the CPU 10a. The memory 10b is a storage device that stores various information such as a user ID, a cat IDs, a feature amounts of a registered cat images, and the like, which are described later. The communication device 10c communicates with the management server 20 via the network 40. The CPU 10a, the memory 10b, and the communication device 10c can be incorporated in the control board M attached to the side surface of the cat toilet 10 (FIG. 2).

The light 10d is an LED light for illuminating the inside and outside of the cat toilet 10. The light 10d makes the cats easier to recognize the cat toilet 10 when the neighborhood is dark, such as the night time zone, improves the photographing condition by the camera 18 and thus improves the accuracy of image recognition when the neighborhood is dark. The design of the cat toilet is increased by coloring the light and the like. Although the light 10d is not shown in FIG. 2, it may be provided in the control board M or other appropriate position that achieves the above-mentioned object.

(Management Server)

The management server 20 includes a CPU (Central Processing Unit) 20a, a ROM (Read Only Memory) 20b, a RAM (Random Access Memory) 20c, a HDD (Hard Disk Drive) 20d, and a communication device 20e.

The CPU 20a executes various kinds of programs and performs arithmetic processing. The ROM 20d stores necessary programs and the like at the time of activation. The RAM 20c is a work area for temporarily storing processing of the CPU 20a and storing data. The HDD 20d stores various data and programs. The communication device 20e communicates with other devices via the network 40.

<Software Configuration>

Figure 9:
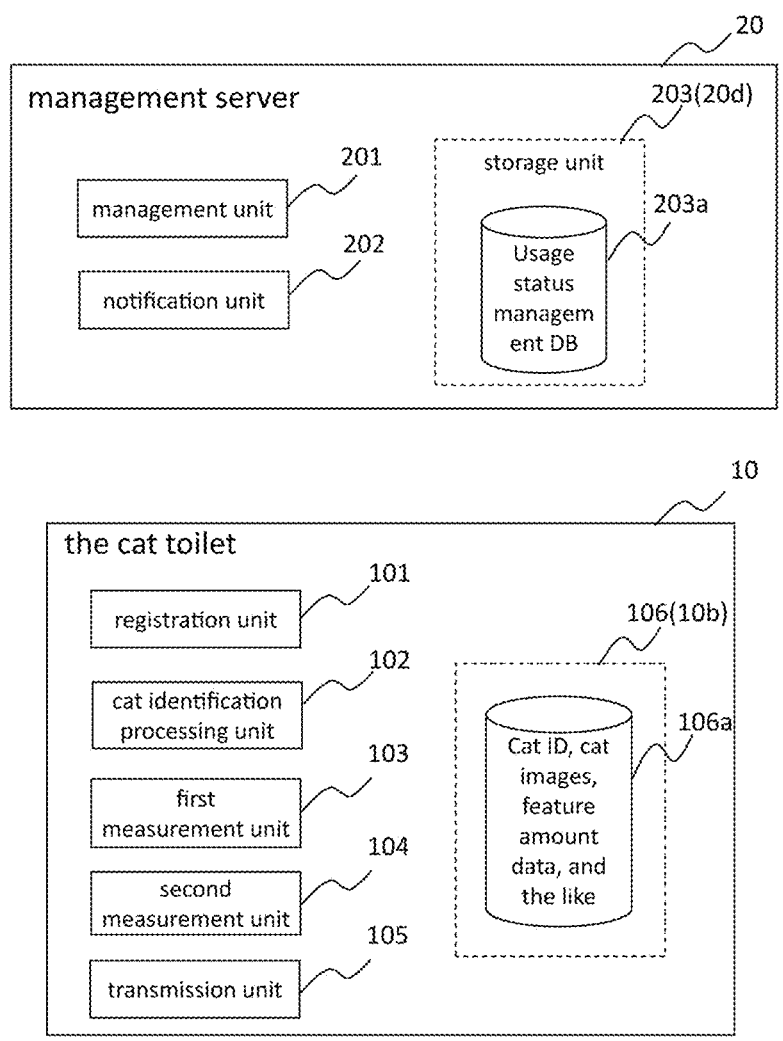
FIG. 9 is a diagram showing a software configuration example of a cat toilet and a management server according to the present embodiment.

FIG. 9 is a diagram showing a software configuration example of the cat toilet and the management server according to the present embodiment.

(Cat Toilet)

The cat toilet 10 includes a registration unit 101, a cat identification processing unit 102, a first measurement unit 103, a second measurement unit 104, a transmission unit 105, and a storage unit 106 as main function units.

The registration unit 101 accepts the registration information of the own cats from the mobile terminal 30 of the user upon the start of the first use of the cat toilet 10. The registration information such as cat IDs, registered cat names, photographic images (face photographs, whole body photographs etc.) is transmitted to the management server 20.

The cat identification processing unit 102 identifies, based on a plurality of images captured by the camera 18, a cat identifier (for example, cat ID) of one cat captured in the plurality of images when a cat enters the cat toilet 10. It is noted that, in the case of owning one cat instead of a plurality of cats, the execution of the cat identification process of the cat identification processing unit 102 may be omitted because the number of the registered cat is one and thus it is not necessary to identify the cat that enters the cat toilet 10.

The first measurement unit 103 measures the body weight (kg) of the cat based on the sensing information from the body weight sensors 19a.

The second measurement unit 104 measures the urine amount of the cat based on the sensing information from the urine weight sensors 19b. It is noted that the second measurement unit 104 can directly convert the urine weight (mg) to urine amount (ml) by multiplying the urine weight (mg) by a predetermined coefficient.

The transmission unit 105 transmits registration information of the own cats by the registration unit 101, the body weights the urine amounts, and the like measured by the first measurement unit 103 and the second measurement unit 104, to the management server 20.

The storage unit 106 has a function of storing the cat DB 106a. The cat DB 106a is a database that stores the cat IDs, the cat images, feature amount data, and the like of the own cats that use the cat toilet 10 for each individual cat. The cat DB 106a is used for cat identifying processing which is described later.

(Management Server)

The management server 20 includes a management unit 201, a notification unit 202, and a storage unit 203 as main functional units.

The management unit 201 uses a usage status management DB 203a to manage the registration information, the body weight of the cats, the number of urinations over a predetermined period (for example, one day), and the urine amounts. Further the management unit 201 updates, when receiving the registration information from the cat toilet 10, the body weight, and the urine amounts, etc., the usage status management DB 203a by reflecting the received information in real time.

The notification unit 202 refers to the usage status management DB 203a and if the notification unit 202 determines that number of urination times or the urine amount of is greater than corresponding the thresholds or determines that the body weight is smaller than a corresponding threshold, calculated in advance based on past actual values of each cat, the notification unit 202 reports the alert information to the mobile terminal 30 of the user.

It is noted that the thresholds are calculated based on the past data in a predetermined period. For example, taking a span of 1 week in advance, an average value of the number of urination and urine amounts of the cat in one day can be used as the thresholds for the urination frequency and the urine amount. In other words, the threshold value can be ordinary values of urination frequency and the urine amount (in an ordinary health). In addition, taking the span of 1 week in advance, a value, which is calculated by calculating an average value of the body weight of the cat and subtracting the predetermined weight loss (for example 0.3 kg or 10%) from the calculated average value, can be used as the threshold for the body weight. Therefore, when the number of times of urination and the urine amount exceed the corresponding thresholds or when the body weight falls below the corresponding threshold value, alert information indicating that there is a possibility of renal failure in the pet cat is reported to the mobile terminal 30 in order to urge the user to pay attention.

The storage unit 203 has a function of storing the usage status management DB 203a. The usage status management DB 203a is a database that stores usage information and status of the cat toilet 10 on a cat basis.

It is noted that each of the above functional units is realized by a computer program executed on the hardware resources of the computer constituting the cat toilet 10 or the management server 20. The functional units may be replaced by "means", "module", "section", or "circuit".

(Management DB)

FIG. 10 is a diagram showing an example of data of the usage status management DB 203a according to the present embodiment. As shown in FIG. 10, the usage status management DB 203a stores data items such as, "user ID", "cat ID", "name", "type", "date of birth", "sex", "weight (body weight), "urination frequency", "urine amount", "body weight threshold (weight threshold)", "urination frequency threshold", "urine amount threshold" etc., for example.

"User ID" indicates a unique identifier to be assigned to each user. "Cat ID" indicates a unique identifier to be assigned to each cat. Even one user (one family) may own a plurality of cats. Name" indicates the name of the cat that the user registers arbitrarily. "Type" indicates the type of cat. "Birth date" indicates the birth date of the cat. "Sex" indicates the sex of the cat.

"Weight (body weight)" indicates the weight (body weight) of the cat at the latest (most recent).

"Urination frequency" indicates the number of urination times (cumulative value) performed by the cat during the predetermined period.

"Urine amount" indicates the urine amount (cumulative value) performed by the cat during the predetermined period.

"Body weight threshold" a reference value for determining whether "body weight" is a value at a normal time or a value at which there is a possibility of abnormality. "Body weight threshold" is calculated in advance on the basis of the past weight value actual value in the predetermined period.

For example, the cat toilet 10 is used for trial, a span of one week is used as the predetermined period, the cat's weight is counted every other day, the average value in one week is calculated, and a value, which is obtained by subtracting predetermined weight loss (corresponding to weight loss in the case of suspected renal failure) from the average value, can be used as "body weight threshold". It is noted that the "body weight threshold" may be calculated in advance on the basis of the past actual value of the body weight or may be an input value inputted by the user based on the weight of the cat in a healthy state, etc., for example.

"Urine frequency threshold" indicates a reference value for determining whether "urination frequency" is a value at a normal time or a value at which there is a possibility of abnormality. "Urine frequency threshold" is calculated in advance on the basis of the past actual number of urination times during the predetermined period.

"Urine amount threshold" indicates a reference value for determining whether "urine amount" is a value at a normal time or a value at which there is a possibility of abnormality. "Urine amount threshold" is calculated in advance based on the past actual value of the urine amount in the predetermined period.

For example, the cat toilet 10 is used for trial, a span of one week is used as the predetermined period, the number of urination and the urine amount of the cat are counted each time, the average values in one week are calculated, and the calculated average values can be used as "urination frequency threshold" and "urine amount threshold".

Since "urination frequency" and "urine amount" are cumulative values in a predetermined period, they are reset to 0 each time a predetermined period (for example, one day) elapses. In addition, the above data items are merely examples. Other data may be provided as necessary.

<Cat Registration Screen>

Figure 11:
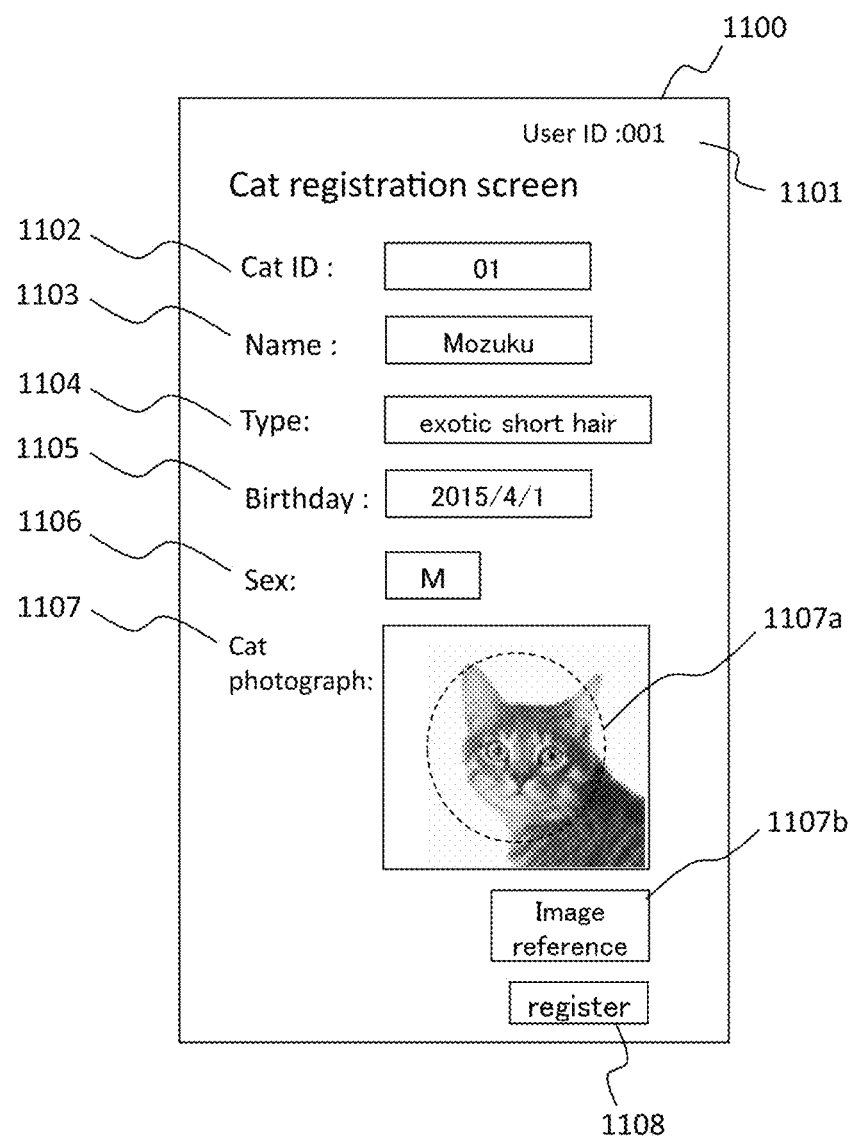
FIG. 11 is a diagram showing an example of a cat registration screen according to the present embodiment.

FIG. 11 is a diagram showing an example of a cat registration screen according to the present embodiment. First, the user accesses the cat registration screen 1100 of the management server 20 by using the mobile terminal 30 or the like, inputs necessary information, and registers the own cat. The user registers for all cats in the case of owning the plurality of cats. It is noted that not only the cat registration screen 1100 of the management server 20, for example, it is also possible to access from the cat registration screen 1100 of a dedicated application that is provided in advance from the management server 20.

"User ID" 1101 is a column indicating the user ID that has been registered in advance and is already logged in. "Cat ID" 1102 is a field for inputting a unique identifier to be added for each cat. It may be input by the user arbitrarily, or it may be automatically numbered. "Name" 1103 is a column in which the user arbitrarily inputs the name of the cat. "Type" 1104 is a column for inputting the type of the cat. "Birth date" 1105 is a field for inputting the date of birth of the cat. "Sex" 1106 is a field for inputting the sex of a cat.

A "cat photograph" 1107 is a column for inputting a photograph of a cat to be used for cat identification processing (cat recognition). Using the camera of the mobile terminal 30, the user photographs and inputs a cat image in accordance with the guide line 1107a so that the face of the cat comes to the center or uploads an existing cat image from "image reference" 1107b. In addition to facial images, cat images (posterior, standing, sitting posture, urination posture, etc.) of a plurality of parts may be input for improving accuracy. A feature amount of the input cat image is extracted and stored in the cat DB 106a in association with the feature amount and the cat ID of the cat.

"Register" 1108 is a registration button of entered registration information. When the "registration" 1108 is pressed by the user, the registration information entered is transmitted from the mobile terminal 30 to the management server 20 and is registered in the usage status management DB 203a. And, the registration information is further transferred from the management server 20 to the cat toilet 10. It is noted that the registration information may be transmitted from the mobile terminal 30 to the cat toilet 10 via short distance communication, Wifi (registered trademark) or the network 40, and transferred from the cat toilet 10 to the management server 20.

Also, the registration information is only an example. Other information may be registered if necessary.

Usage Example

Figure 12:
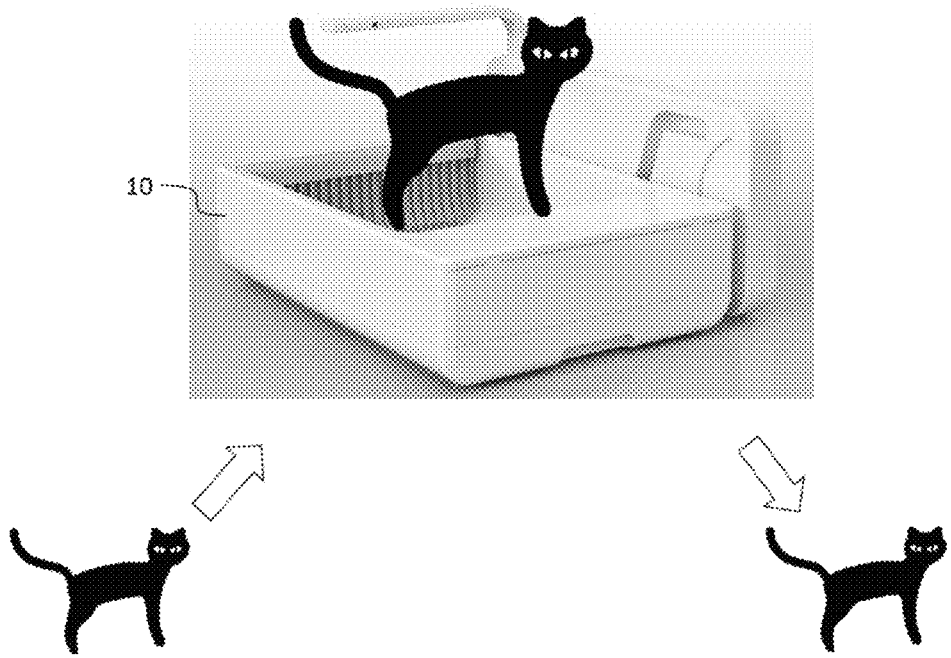
FIG. 12 is a diagram showing an example of use of a cat toilet according to the present embodiment.

FIG. 12 is a diagram showing an example of use of the cat toilet according to the present embodiment. When the registered cat enters the cat toilet 10 and performs urination, the cat toilet 10 detects the urination.

More specifically, the cat toilet 10 measures the weight of the cat after identifying the cat in the toilet by image recognition and updates the usage status management DB 203a based on whether or not the cat actually performed urination.

In case of urination, the cat toilet 10 measures the body weight and the urine amount of the cat and transmits the measured body weight and urine amount to the management server 20. The management server 20 updates the "body weight" to the measured body weight on the usage status management DB 203a, increments the "urination frequency" by 1, and adds the urine amount measured to the "urine amount".

In the case of doing nothing (state-seeking action), although the pet cat entered the cat toilet 10, but only the behavior like state-seeking action, for example, was seen, the actual excretion action (voiding urination and excretion behavior) was not performed. In this case, the cat toilet 10 measures the body weight of the cat and transmits the measured body weight to the management server 20. The management server 20 updates the "body weight" to the measured body weight on the usage status management DB 203a. As a result, the cat toilet 10 can measure and update the latest body weight even in the case of so-called state-seeking actions that do not involve common excretion behavior common to cats.

It is noted that in the cat toilet usage management system 100 according to the present embodiment, only the presence or absence of urination is determined from the viewpoint of the early detection of cat renal failure, but needless to say, it is also possible to determine only the presence or absence of defecation behavior as the cat toilet usage management system, detect and count "defecation count", "defecation amount" and display these on the system.

<Usage Status Management Screen>

Figure 13:
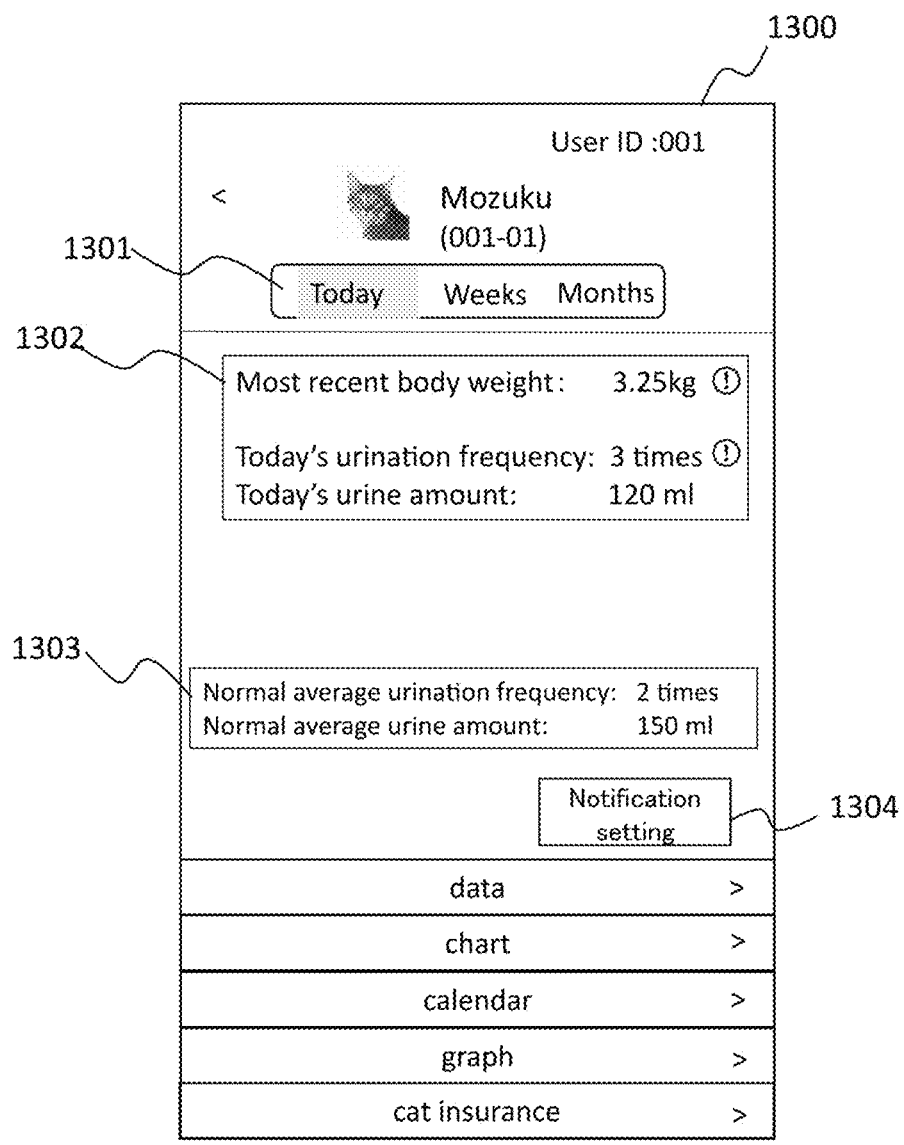
FIG. 13 is a diagram showing an example of a management screen of a portable terminal according to the present embodiment.

FIG. 13 is a diagram showing an example of the management screen of the mobile terminal according to the present embodiment. Using the mobile terminal 30 or the like, the user can access the management screen 1300 for logging in from the management server 20 or the management screen 1300 of the special application and view the use condition of each toilet with respect to the registered pet cats.

The column 1301 is a column for selecting the period unit of the toilet use situation that the user wishes to view. Today, weeks, months and so on are used. When a weeks or months are selected in the column 1301, similar information is displayed as a total value every week and month.

The column 1302 is a column indicating the use condition of the toilet in the selected period unit. Specifically, based on "body weight", "urination frequency", and "urine amount" of the usage status management DB 203a, "today's body weight", "today's urination frequency", and "today's urine amount" are displayed.

The column 1303 is a column showing the reference value of the toilet use situation of the cat at the normal time. Specifically, based on the "urination frequency threshold" and the "urine amount threshold" of the usage status management DB 203a, "normal average urination frequency" and "normal average urine output amount", respectively, are displayed.

The column 1304 is a "notification setting" button. As described above, when the "number of urination" or "urine amount" is larger than the threshold "normal urination frequency" or "normal urine output average" for each registered cat during the predetermined period (for example, 1 day) or "the body weight" is smaller than the threshold "body weight threshold" value for each registered cat, the alert information is notified to the mobile terminal 30 of the user. In the "notification setting", the user can make various settings such as notification method (notification on the application, notification by e-mail etc.), notification frequency, threshold change setting, and the like. For example, in the case of "normal average urination frequency" 3 times, the default setting is to notify by "number of urination times" 4 times, but it is also possible to change this to 5 times.

Figure 14:
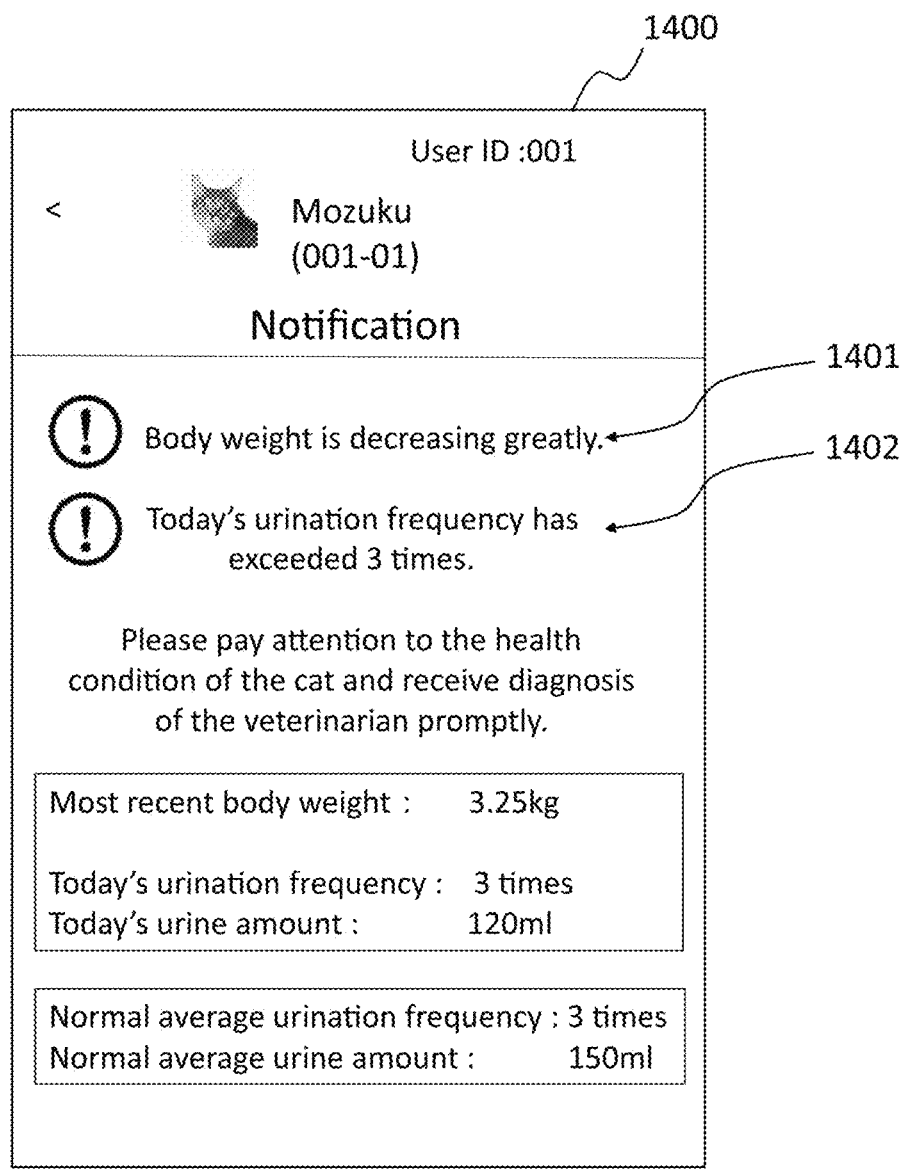
FIG. 14 is a diagram showing an example of a notification screen of the portable terminal according to the present embodiment.

FIG. 14 is a diagram showing an example of the notification screen of the mobile terminal according to the present embodiment. The notification screen 1400 shows a notification screen notified from the dedicated application.

When the "body weight" is smaller than the threshold value "body weight threshold" for each registered cat, alert information 1401 is notified to the mobile terminal 30 of the user as toilet use information for calling attention.

If the "urination frequency" or "urine amount" is larger than the threshold "normal average urination frequency" or "normal average urine amount" for each registered cat during the predetermined period (for example, one day), the mobile terminal 30, the alert information 1402 is notified as toilet use information for calling attention. As a result, when the number of urination times and urine amount in the own cat more than the normal time (normal time) are observed, the alert information including use information of the cat toilet 10 is notified.

The alert information is such a message as "Body weight is decreasing greatly", "Today's urination frequency has exceeded 3 times", "Please pay attention to the health condition of the cat and receive a diagnosis of the veterinarian promptly", which can prompt the user to visit to a veterinarian by the message. Also, for example, it is also possible to more specifically prompt attention to the fact that there is a suspicion of renal failure, such as, "Mozuku has suspicion of renal failure, and thus please get a diagnosis of a veterinarian".

As described above, in the case of cats, as symptoms of urological diseases, there are features such as an increase in the number of urinations and urine amount and body weight loss, the cat toilet 10 according to the present embodiment can detect, at once in daily living, an increase in urination frequency and urine amount and loss of body weight as well as body weight loss as a precursor symptom suspected of renal failure and even if the own cat is a diagnosis of renal failure, it is possible to discover this in stage 2 of IRIS stage classification.

That is, when detecting an increase in the number of urinations and urine amount and body weight loss, the user suspects renal failure of the cat to have the cat see the veterinarians or the like as soon as possible. Even if it is diagnosed as renal failure by the blood test, it is possible to recover up to a healthy appearance again by the new drug effect of the above-mentioned in the case of stage 2, 3.

<Information Processing>

Information processing of the toilet usage management system 100 according to the present embodiment will be described.

(Measurement Processing of Cat Toilet)

Figure 15:
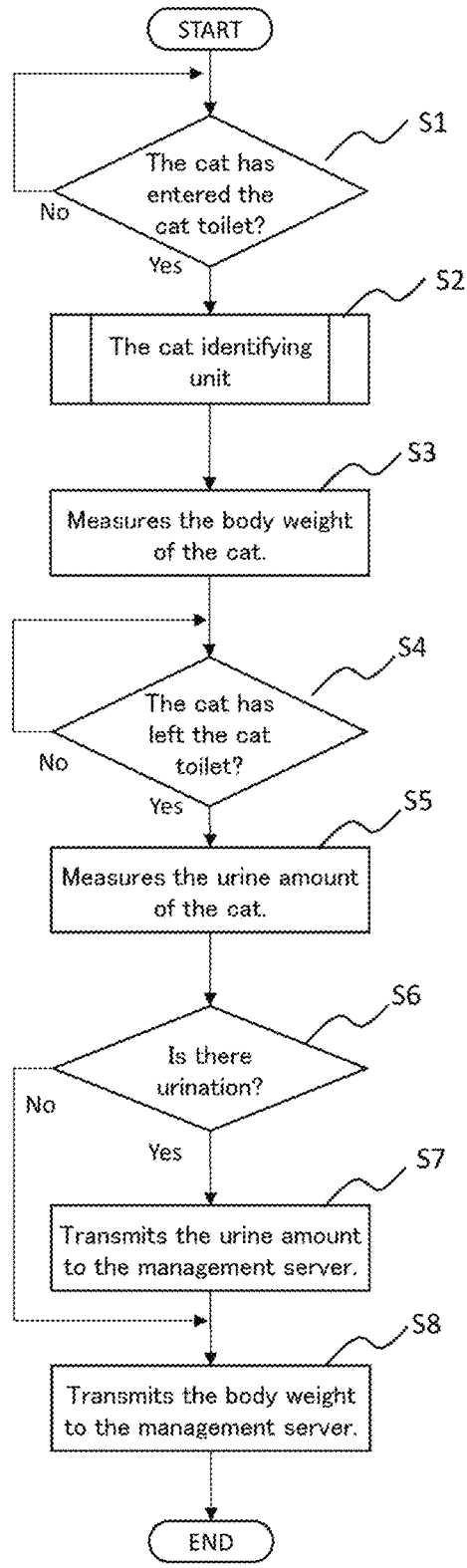
FIG. 15 is a flowchart showing measurement processing of the cat toilet according to the present embodiment.

FIG. 15 is a flowchart showing measurement processing of the cat toilet according to the present embodiment.

S1: The cat identification processing unit 102 determines whether or not the cat has entered the cat toilet 10. As a determination method, for example, when a cat is recognized in the image captured by the camera 18, it can be determined that the cat has entered the cat toilet 10. In addition to the determination by the cat identification processing unit 102, it can be determined that the cat has entered the cat toilet 10, for example, when weight is detected by the body weight sensors 19a, for example.

S2: When a cat enters the cat toilet 10, the cat identification processing unit 102 identifies the identifier (for example, the cat ID) in one of the images captured in the plurality of images based on the plurality of images captured by the camera 18. In managing the use situation of the cat toilet 10, it is possible to cope with the case of owning a plurality of cats by identifying the cat ID of the cat which entered among the plurality of cats. The cat identification process will be described later in detail.

S3: The first measurement unit 103 measures the body weight of the cat based on the sensing information from the body weight sensors 19a. As described above, since the loads of the lower layer toilet container 12 and the upper layer toilet container 11 act on the body weight sensors 19a when the cat enters the cat toilet 10 (in the case of riding on the upper toilet container 11), the weight measuring sensors 19a detects the weight change before and after the cat enters the cat toilet 10 so that the first measurement unit 103 can measure the body weight.

S4: The cat identification processing unit 102 determines whether or not the cat has left the cat toilet 10. According to the determination method, when a cat is recognized in the image captured by the camera 18, it can be determined that the cat has entered the cat toilet 10. If it is determined that the cat has left the cat toilet 10, the process proceeds to S5. If not, the process goes to S4 again and waits until the urination of the cat is completed until all the urination of the cat is completed.

S5: The second measurement unit 104 considers that the urination of the cat is all completed at the timing when the cat leaves the cat toilet 10 and measures the urine amount of the cat based on the sensing information from the urine weight sensors 19b. As described above, since only the load of the urine collection tray 13 acts on the urine weight sensor 19b, when the cat urinates, the urination passes through the manure urination separation holes 14 and is accepted to be absorbed in the pet sheets laid in the urine collection tray 13 and the weight measuring sensors 19b detect the weight change of the urine collection tray 13 before and after the urination, so that the second measurement unit 104 can measure the urine amount.

S6: The cat toilet 10 determines whether there is urination or not. For example, when the urine amount measured by the second measurement unit 104 is greater than 0, it can be determined that there is urination.

S7: The transmitting unit 105 transmits the urine amount measured in S5 to the management server 20 together with the user ID held in the memory 10b by the cat toilet 10 and the cat ID specified in S2.

S8: The transmission unit 105 transmits, to the management server 20, the body weight measured in S3 together with the user ID held in the memory 10b by the cat toilet 10 and the cat ID specified in S2. In the case of executing S7, the urine amount and the body weight may be collectively transmitted in S8.

The transmission unit 105 transmits the registration information of the own cat by the registration unit 101, the body weight the urine amount, and the like measured by the first measurement unit 103 and the second measurement unit 104, to the management server 20.

Even when two or more toilets are installed, such as the cat toilet 10-1 and the cat toilet 10-2, the main measurement process is executed with each cat toilet. For this reason, when the same cat urinates once with the cat toilet 10-1 and then urinates once with the cat toilet 10-2, since each cat toilet performs the main measurement process individually, it is possible to accurately count the urine amount of the same cat by totaling the urine amount on the management server 20 collectively.

For example, the cat toilet 10 can be installed in an appropriate place in the house. Regarding the number of installed cat toilets, there are many owners who install a plurality of cat toilets, such as cat toilet 10-1 and cat toilet 10-2, even in the case of owning one cat recently, as well as owning the plurality of the cats.

(Notification Process of Management Server)

Figure 16:
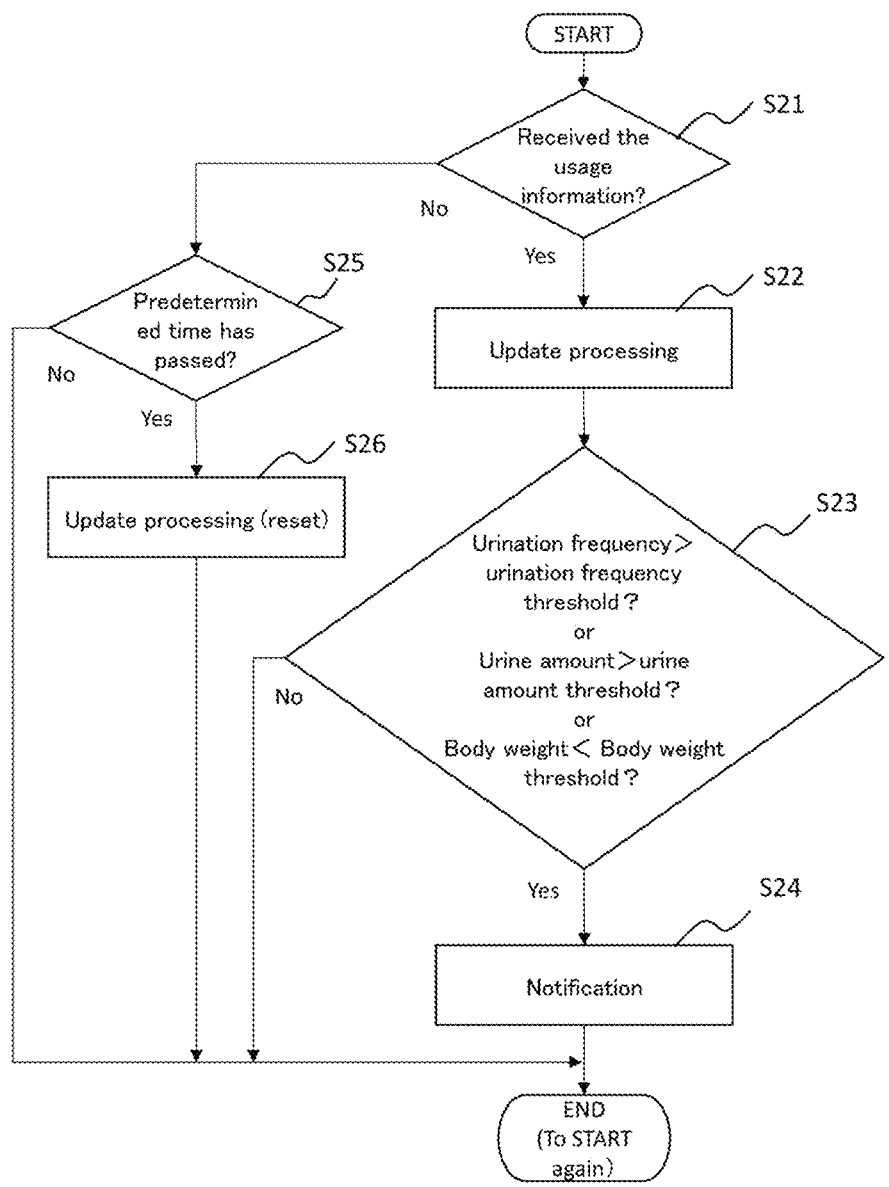
FIG. 16 is a flowchart showing notification processing of the management server according to the embodiment.

FIG. 16 is a flowchart showing the notification process of the management server according to the present embodiment.

S21: The management unit 201 determines whether or not the usage information is received together with the user ID and the cat ID from the cat toilet 10. It is noted that the usage information mentioned here is information indicating the usage situation of the cat toilet 10, specifically, the body weight and urine amount transmitted from the cat toilet 10, or one of them.

S22: The management unit 201 executes update processing. Specifically, in the usage status management DB 203a (FIG. 10), "body weight" is updated to the received body weight in association with the received user ID and cat ID, the "urination frequency" is incremented by 1, and the received urine amount is added (accumulated) to "urine amount".

S23: The notification unit 202 refers to the usage status management DB 203a to determine, as the precursor symptom suspected of renal failure, whether or not at least any one of conditions, including a condition where the "urination frequency" is greater than the "urination frequency threshold", a condition where "the urine amount" is greater than the "urine amount threshold", and a condition where the "body weight" is smaller than the "body weight threshold" is satisfied.

S24: The notification unit 202 notifies the user's mobile terminal 30 of the alert information indicating that there is a possibility of signs of renal failure to the own cat. As a result, increase in urination frequency and urine amount and weight loss as a precursor symptom suspected of renal failure can be detected at once and the user can be promptly notified.

S25: The management unit 201 determines whether or not a predetermined time has passed.

S26: The management unit 201 executes the update processing (reset). As described above, the urination frequency and the urine amount are cumulative values in a predetermined period. Therefore, every time a predetermined period of time (for example, one day) elapses, the usage status management DB 203a resets all the values of urination frequency and urine amount to 0.

(Cats Specific Treatment for Cat Toilet)

In the case of owning the plurality of cats, it is necessary to identify which cat among the owned cats has entered the cat toilet 10. As a general cat identification method, for example, there is a method of identifying a cat individually by attaching a collar equipped with an RFID (radio frequency identifier) tag to a cat. However, some cats dislike the collar, so forcing the collar will forcibly cause stress and eventually cause illness.

Therefore, the cat identifying process according to the present embodiment precisely identifies one cat that entered the cat toilet 10 by individually identifying the cat from the cat image of the camera 18 as described below, when a cat enters the cat toilet 10, without stressing the own cat. Hereinafter, the cat identification process according to the present embodiment will be described in detail.

Preparatory Process

At the beginning of the first use of the cat toilet 10, the registration information of the own cat is received from the mobile terminal 30 of the user. Specifically, as described above, the user accesses the cat registration screen 1100 of the management server 20 using the mobile terminal 30 or the like, and inputs registration information such as cat ID, registered cat name, cat image, etc., to register all the own cats (FIG. 11). The cat identification processing unit 102 extracts each characteristic amount from the input cat image, stores it in the cat DB 106a in association with the characteristic amount and the cat ID of the cat. Further, from the cat image data captured and accumulated after the operation starts, more characteristic amounts are automatically extracted, and the characteristics of the cat are learned more deeply (deep learning model).

Cat Identification Process

The cat identifying process (S2 of FIG. 15) of the cat toilet will be described.

If the cat has entered the cat toilet 10, the cat image is picked up by the camera 18 at first. It is not always possible to capture a frontal face image with high accuracy with only one cat image. Therefore, the camera 18 captures a plurality of cat images of a predetermined number or more. Since the same and homogeneous cat images may be taken even if they are continuously captured, by photographing cat images at predetermined time intervals or more and at predetermined time intervals, various cat images such as multi-directional and multi-postured cat images can be captured.

Next, an appropriate cat image with good image quality for use in the cat identifying process is selected from the number of captured cat images. As selection criteria, for example, it is possible to select a cat image with small blurring or blurring amount by calculating the blurring or blurring amount of the subject or select a cat image in which the cat's face is detected by performing cat face detection processing. It is noted that it is assumed that not only one but a plurality of suitable cat images are selected.

Next, the verification degree will be described before executing the cat identifying process using a plurality of photographed cat images here.

Figure 17:
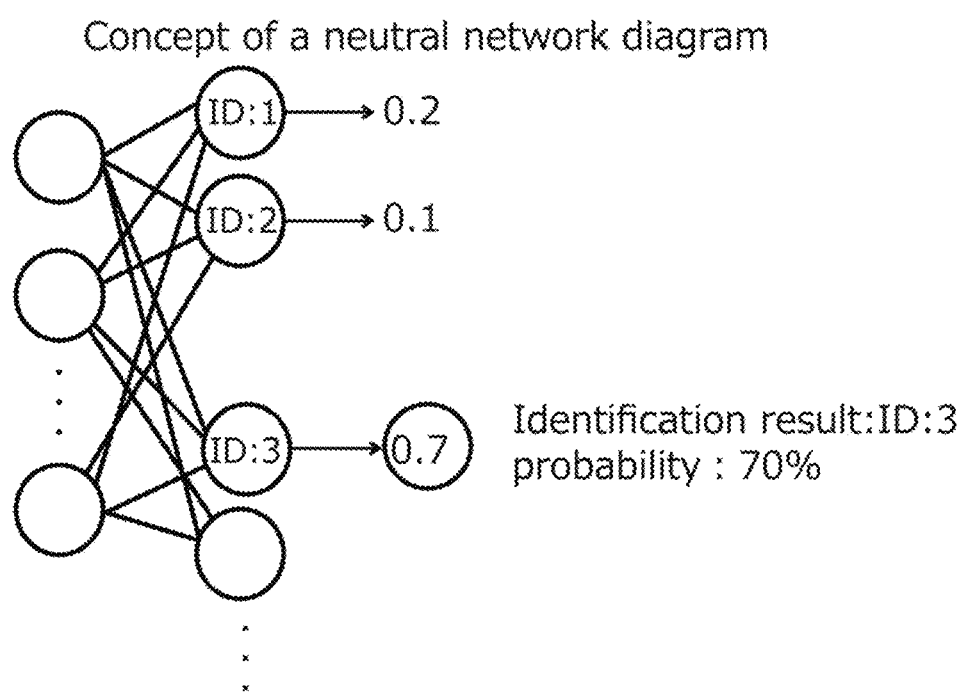
FIG. 17 is a diagram showing a concept of a neural network according to the present embodiment.

FIG. 17 is a diagram showing a concept of a neural network according to this embodiment. Generally, when solving a classification problem with a neural network, a soft max function is used as an activation function of the output layer. As a result, the outputted numerical value can be handled as the probability that the input image belongs to each class. For example, if the probability that an input image belongs to a class (ID: 1) is 0.2, the probability that it belongs to another certain class (ID: 2) is 0.1, and the probability that it belongs to another certain class (ID: 3) is 0.7, it is determined that the input image belongs to the class of ID: 3 having the highest probability (hereinafter referred to as the verification degree).

Also, in this embodiment, the cat ID of the cat belonging to the class with the highest verification degree is set as the identification result with respect to the input cat image. However, when acquiring the respective verification degrees for the selected plurality of cat images, depending on the cat images, there is a case where it is difficult to identify one cat with different verification degrees for different cats. Cat is an animal and thus its posture is not always the same because of the animal's posture, so it is not always possible to always capture high quality cat images. Therefore, in this case, in this embodiment, a majority vote of the identification result is used to finally specify one cat. A specific example will be described below.

FIG. 18 is a diagram for explaining a cat identification example 1 according to the present embodiment. The cat images A to E are cat images selected by satisfying the selection criteria from among the captured cat images.

First, each feature amount is extracted from the cat images A to E. When the feature amount is extracted, the cat ID and verification degree corresponding to the class to which each cat image can belong is acquired based on the degree of matching with each feature amount of the cat image stored in the cat DB 106a.

As shown in FIG. 18, in the case of the cat image A, it is classified into the class of cat ID: 01 or cat ID: 02 based on the feature amount of the cat image A, and furthermore, for each cat ID, each verification degree of 99% and 1% that is the probability of belonging to the class (the degree of correctness or falsehood) are acquired. This means that cats image A cat ID: 01 in cat or cat ID specified: 02 be either cats identified, probability 99% respectively which is one of feline, that 1%. Similarly, the cat ID and verification degree corresponding to the class to which each cat image belongs are acquired for the cat image BE.

From cat images A, C, and E, the identification result of the image of cat ID:01 of the cat "Mozuku" whose verification degree is the highest. On the other hand, from the cat images B and D, the identification result of the image of cat ID:02 of the cat "Momo" whose verification degree is the highest. This means that, despite the cat images A to E which are supposed to be images of the same cat, the identification result indicating that they are different cats has come out.

Next, majority votes are taken against the identification result for each cat image, and finally one cat is specified. Here, among the five identification results, cats "Mizuku" of cat ID: 01 gets 3 votes of cat images A, C, E, and cat "Momo" of cat ID: 02 is 2 votes of cats images B and D, and the cat "Mizuku" of the cat ID: 01 is finally identified as one cat captured in the cat images A-E this time. With this, it is possible to precisely identify the cat who entered the cat toilet 10.

Shortly after the operation of the individual identification system starts, in particular, there is an image whose verification degree is high in spite of an error in the individual identification for the cat. Also, even when the operation period is long, cats are not stable in their posture, for example, there is a possibility that the verification degree becomes high regardless of being incorrectly identified, depending on the angle and shadow of the face of the cat appearing in the cat image, etc. Therefore, even if the identification result of one cat image having the highest verification degree is simply adopted, the accuracy does not improve, so in the present embodiment, by taking a majority vote in a plurality of cat images, the accuracy of the final identification result is improved. Due to majority voting, even if only one to a few cat images are incorrectly identified with the high verification degree, a correct identification result can be obtained if there are more cat images for which the identification is not erroneous.

Also, the final verification degree is calculated for the cat "Mizuku" with the cat ID: 01 specified as the one cat shown in the cat images A to E. The final verification degree can be calculated based on the average value of the verification degrees of the cat images A, C, E for which the cat "Mozuku" of cat ID: 01 is voted, for example. Specifically, the final verification degree for the cat "Mozuku" with the cat ID: 01 is the average value (99+97+90)/3=95.3%.

Incidentally, in addition to the average value, the final verification degree is, for example, the maximum value (99%) and the minimum value (90%), a median (97%), or the like of the verification degree of the cat images A, C and E of the cat "Mozuku" of the cat ID: 01.

In order to improve the accuracy of the identification result from the next time, the cat image that issued the identification result ID: 02 different from the cat ID: 01 which is the final identification result is registered and learned as a correct cat image of the cat ID: 01. With this arrangement, it becomes possible to identify the cat ID: 01 correctly from the next image (cat image which is mistakenly identified as cat ID: 2 although it is actually a cat image of cat ID: 1). It goes without saying that since a plurality of target cat images are a series of images taken by the camera 18 in consecutive photographs of cats entering the cat toilet 10, it is natural that one cat (in this case, the cat with the cat ID: 01) and there is no mixture of pictures of other cats (for example the cat with the cat ID: 02). In other words, in all the cat images A to E, the cat with the cat ID: 01 is captured.

FIG. 19 is a diagram for explaining a cat identifying example 2 according to the present embodiment. In the case of FIG. 19, out of all 5 identification results, 2 votes for the cat "Mizuku" with cat ID: 01, 2 votes for the cat "Momo" with cat ID: 02, and 1 vote for the cat with cat "Tama" ID: 03 are obtained. That is, the cat "Mizuku" with the cat ID: 01 and the cat "Momo" with the cat ID: 02 are the same number of 2 votes, and one cannot be identified by majority vote.

In this way, when one cat cannot be specified by majority voting of the identification result, one cat is ultimately specified based on the evaluation value. The evaluation value can be calculated, for example, based on the average value of the verification degrees of the cat images on each vote. Specifically, the evaluation value on the vote side of the cat "Mizuku" with the cat ID: 01 is the average value (95+93)/2=94% of the verification degree. The evaluation value on the vote side of the cat "Momo" with the cat ID: 02 is the average value (80+90)/2=85% of the verification degree. Therefore, the cat "Mozuku" with the cat ID: 01 having the highest evaluation value finally is identified as one cat shown in this time cat images A to E.

Also, the final verification degree is calculated for the cat "Mizuku" with the cat ID: 01 specified as the one cat shown in the cat images A to E. Specifically, the final confirmation level for the cat "Mozuku" with the cat ID: 01 specified as one cat is the average value (95+93)/2=94%.

In addition to the average value of the verification degree, the one whose maximum value of the verification degree is greater, the one whose minimum value of the verification degree is greater or the one whose median value is greater may be used. Also, when there is no difference in the verification value, the one with the smaller cat ID value is identified as the final one cat, and the final verification degree is set to 0.

Figure 20:
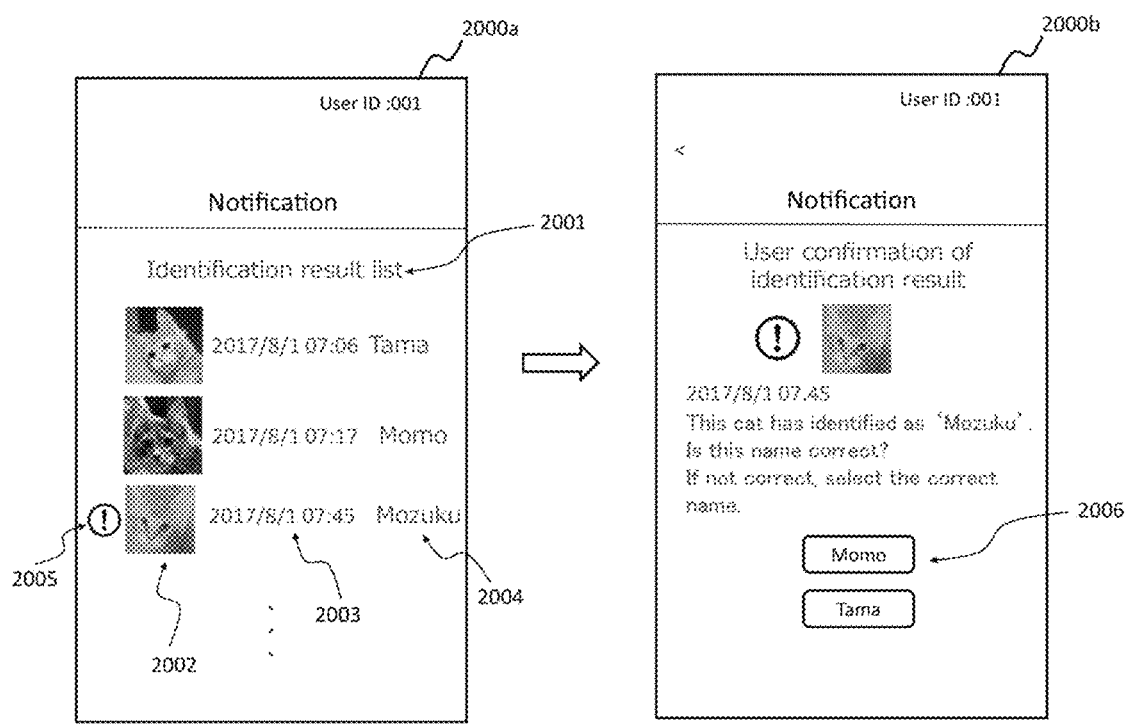
FIG. 20 is a diagram for explaining user confirmation of the identification result according to the present embodiment.

FIG. 20 is a diagram for explaining the user confirmation of the identification result according to the present embodiment. The identification result list screen 2000a shows a history list of identification results, and includes, for example, one representative cat image 2002 out of a plurality of captured cat images, identification date 2003 showing the identified date and time, and a name of a cat as an identification result 2004 are listed.

Here, if an incorrect identification result is learned in the cat DB 106a, the identification accuracy will be deteriorated. Ideally in order to prevent this, it is only necessary for the user to be able to confirm all the correctness of the identification result every time, but it takes time and effort. Therefore, in the identification result list screen 2000 according to the present embodiment, when there is an identification result in which the verification degree (final verification degree) with respect to the identification result is lower than a predetermined threshold value (for example, 80% or the like) exists, an icon 2005 prompting user confirmation is displayed together.

When the user performs an operation such as tapping the icon 2005, the screen transitions to the user confirmation screen 2000b of the identification result. In the user confirmation screen 2000b of the identification result, the cat image and the name of the cat as the identification result are confirmed and displayed, and when the name of the cat appearing in the cat image is incorrect, it is correct the user is promoted to perform a selection input of a correct name 2006 to correct the error so that the correct identification result is obtained (re-specified).

As a result, the correct combination of the cat image and the cat ID is obtained by the user's own determination, and the correct identification result is learned in the cat DB 106a, whereby it is possible to further improve the identification result of the cat image.

SUMMARY

As described above, in the cat toilet usage state management system 100 according to the present embodiment, it is possible to simultaneously measure the weight and urine amount of the cat. That is, information on the health status of cats can be easily measured in the daily activities of cats.

In addition, since the cat toilet 10 according to the present embodiment can be manufactured with a relatively small number of components and a simple structure, it can be provided at low cost. Furthermore, since it is easy for the user to disassemble and assemble it by themselves, cleaning is easy and it is possible to keep the toilet clean for prevention of diseases.

In addition, when the number of urination times or urine amount is seen in the own cat more than the normal time (normal time), or when the weight loss is observed, the alert information is notified to the user. This allows users (owners) to discover polyuria symptoms and weight loss suspected of renal failure in own cats at a relatively early stage, and even if they are diagnosed as renal failure by examination, it can be expected that the own cat recovers to the healthy form again thanks to a new drug effect.

Also, in the case of owning a plurality of cats, in order to manage the health status of each cat using the cat's toilet, it is possible to precisely identify one cat that has entered the cat toilet 10.

It is to be noted that, although the present invention has been described with reference to specific embodiments according to preferred embodiments of the present invention, it is to be understood that these embodiments may be modified without departing from the broader spirit and scope of the invention as defined in the appended claims. It is obvious that various modifications and changes can be made to the examples. That is, the present invention should not be construed as being limited by the details of specific examples and the attached drawings.

For example, the cat toilet 10 is a two-layer fully automated toilet. The cleaning function operates every time it is excreted, and the user can instruct the operation from the dedicated application at an arbitrary timing. Moreover, it is possible to see the inside of the cat toilet from the dedicated application via the camera.

For a user who cannot use the mobile terminal 30, for example, by providing a liquid crystal display and operation keys on the cat toilet 10, instead of the mobile terminal 30, It is also possible to perform the cat registration, display usage status of the cat, and notify with an alert sound in case of abnormality.

Also, depending on the installation environment, when the management server 20 cannot be used, such as when there is no Internet environment for connecting the cat toilet 10 and the management server 20, it is also possible to use the cat toilet alone. In this case, each functional unit of the management server 20 may be provided on the cat toilet 10 side.

Also, the present invention is not limited to only cats, but can also be applied to other pets (dogs, etc.), for example.

DESCRIPTION OF REFERENCE SYMBOLS

10 Cat toilet
20 Management server

30 Mobile terminal
40 Network
100 Cat toilet usage management system
101 Registration unit
102 Cat identification processing unit
103 First measurement unit
104 Second measurement unit
105 Transmission unit
106 Storage unit
201 Management unit
202 Notification unit
203 Storage unit

The invention claimed is:

1. A toilet usage management system for cats, the toilet usage management system including a cat toilet to be used by a plurality of cats, a user terminal, a management server, and reporting information on a use of the cat toilet to the user terminal, wherein the cat toilet includes;
 a camera that captures a plurality of images of the cats entering the cat toilet at predetermined time intervals, and
 a CPU is configured to identify an identifier of a same cat appearing in the plurality of images based on a plurality of images captured by the camera;
 extract feature amounts from the plurality of images, respectively, acquire a verification degrees, each of which indicates a likelihood of the identifier of corresponding one cat, for each image on the basis of the feature amount, respectively, determine, based on the acquired verification degrees, the identifier of one cat as an identification result for each image of the plurality of images, and identify the identifier of the same cat appearing in the plurality of images based on a majority decision of the identification results,
 display at least one image out of the plurality of images and the identifier of the same identified cat when the verification degree is smaller than a predetermined threshold value, and
 identify again, when an identifier of a cat, which is different from the identifier of the same identified cat, is inputted from the user terminal by the owner of the plurality of cats, the inputted identifier of the cat as an identifier of the same cat appearing in the plurality of images,
 the user terminal is configured to, display at least one image out of the plurality of images and the identifier of the same identified cat with an icon prompting user confirmation when the verification degree is smaller than a predetermined threshold value.

2. The toilet usage management system according to claim 1, the CPU is configured to;
 acquire the verification degrees when the identifier of the same cat appearing in the plurality of images cannot be specified based on the majority decision of the identification result, and
 identify the identifier of one of the cats having the largest verification degree, among the identifiers of the cats which become the largest number in the majority decision, as the identifier of the same cat appearing in the plurality of images.

3. A cat toilet that is used by a plurality of cats, and notifies a user terminal with information on a use of the cat toilet to the user terminal, wherein the cat toilet includes;
 a camera that captures a plurality of images of the cats entering the cat toilet at predetermined time intervals, and
 a CPU is configured to identify an identifier of a same cat appearing in the plurality of images based on a plurality of images captured by the camera;
 extract feature amounts from the plurality of images, respectively, acquire a verification degrees, each of which indicates a likelihood of the identifier of corresponding one cat, for each image on the basis of the feature amount, respectively, determine, based on the acquired verification degrees, the identifier of one cat as an identification result for each image of the plurality of images, and identify the identifier of the same cat appearing in the plurality of images based on a majority decision of the identification results,
 display at least one image out of the plurality of images and the identifier of the same identified cat when the verification degree is smaller than a predetermined threshold value,
 identify again, when an identifier of a cat, which is different from the identifier of the same identified cat, is inputted from the user terminal by the owner of the plurality of cats, the inputted identifier of the cat as an identifier of the same cat appearing in the plurality of images, and
 the user terminal is configured to display the at least one image out of the plurality of images and the identified identifier of the same cat with an icon for prompting user confirmation when the verification degree is smaller than the predetermined threshold value.

\* \* \* \* \*